United States Patent
Okamoto

(10) Patent No.: US 7,702,920 B2
(45) Date of Patent: Apr. 20, 2010

(54) STORAGE CONTROL DEVICE, HOST INTERFACE CONTROL UNIT OF STORAGE CONTROL DEVICE, AND INFORMATION PROTECTION METHOD OF STORAGE CONTROL DEVICE

(75) Inventor: Homare Okamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1187 days.

(21) Appl. No.: 11/228,244

(22) Filed: Sep. 19, 2005

(65) Prior Publication Data
US 2007/0043944 A1 Feb. 22, 2007

(30) Foreign Application Priority Data
Jul. 11, 2005 (JP) ............... 2005-201099

(51) Int. Cl.
*G06F 12/14* (2006.01)
*H04L 9/00* (2006.01)
(52) U.S. Cl. ............ 713/191; 713/168; 713/187; 713/193; 713/194; 726/26; 726/34
(58) Field of Classification Search ............ None
See application file for complete search history.

(56) References Cited

U.S. PATENT DOCUMENTS 6,859,537 B1 * 2/2005 Houlberg et al. ............ 380/277
7,073,092 B2 * 7/2006 Okamoto et al. ............ 714/18
7,080,259 B1 * 7/2006 Nakanishi et al. ........... 713/193
7,389,429 B1 * 6/2008 Trimberger ................. 713/194

FOREIGN PATENT DOCUMENTS

| JP | 10-333839 | 5/1997 |
| JP | 2001-265655 | 8/2000 |
| JP | 2005-134961 | 10/2003 |

* cited by examiner

*Primary Examiner*—Kaveh Abrishamkar
(74) *Attorney, Agent, or Firm*—Foley & Lardner LLP

(57) ABSTRACT

When a channel adapter (CHA) is replaced, the storage control device of the present invention deletes the security information held in the channel adapter to improve security. The CHA conducts encrypted communications with the host. Security information (encryption keys and the like) employed in encrypted communications is stored in the port memory of each communications port. When replacement of the CHA is designated, the processor causes the security information stored in the port memory to be saved to shared memory, and deletes the security information in the port memory. When a new CHA is installed, the security information stored in the shared memory is transferred to the port memory.

8 Claims, 11 Drawing Sheets

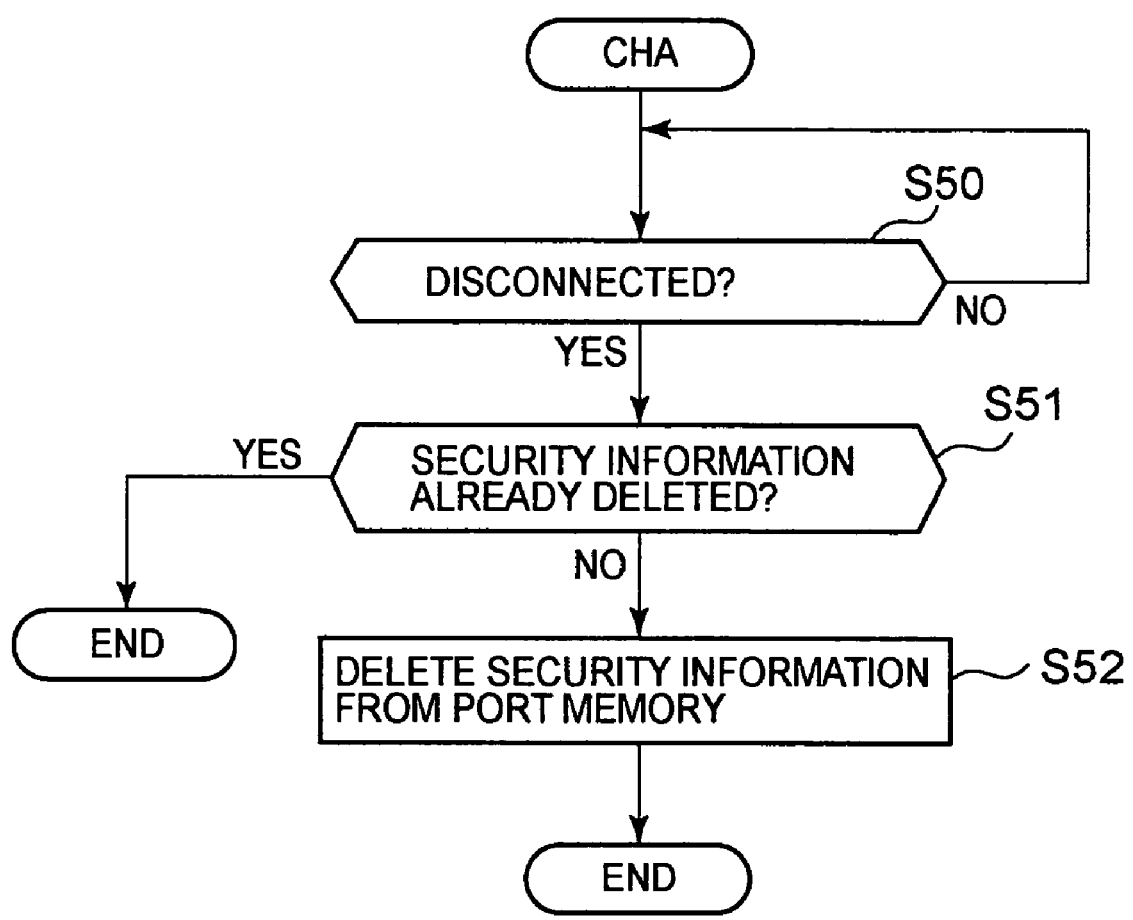

STORAGE CONTROL DEVICE, HOST INTERFACE CONTROL UNIT OF STORAGE CONTROL DEVICE, AND INFORMATION PROTECTION METHOD OF STORAGE CONTROL DEVICE

CROSS-REFERENCE TO RELATED APPLICATIONS

This application relates to and claims priority from Japanese Patent Application No. 2005-201099 filed on Jul. 11, 2005, the entire disclosure of which is incorporated herein by reference.

BACKGROUND OF THE INVENTION

1. Field of the Invention

The present invention relates to a storage control device, host interface control unit of a storage control device, and information protection method of a storage control device.

2. Description of the Related Art

The storage control device is, for example, disk drives such as hard disk drives, disposed in an array, and providing a storage area based on RAID (Redundant Array of Inexpensive Disks) to the host computer (hereafter referred to as 'the host'). The host accesses, and reads and writes data to and from, the logical storage area provided by the storage control device.

Fiber Channel Protocol and iSCSI (internet Small Computer System Interface), for example, are known as protocols for communications between the storage control device and the host. With iSCSI, the storage control device can be accessed via an IP network such as the Internet by encapsulating SCSI commands into TCP/IP packets.

However, since various information employed by institutions such as industry, financial institutions, government institutions, and educational institutions is stored in storage control devices, protection from illegal access to this information is necessary. Therefore, technology has been proposed with which, for example, the association between a WWN (World Wide Name) and port identification information, or the association between a WWN and a LUN (Logical Unit Number) is described in a table beforehand, and approval or denial of access is controlled while referencing this table (Japanese Unexamined Patent Publication No. H10-333839, Japanese Unexamined Patent Publication No. 2001-265655).

On the other hand, in this case of iSCSI using a TCP/IP network, technology has also been proposed with which the MAC (Media Access Control) address is employed to evaluate whether or not a host has access privileges (Japanese Unexamined Patent Publication No. 2005-134961).

When transferring data using iSCSI and TCP/IP networks, packet monitoring by a third party must also be considered. Therefore, for example, the use of encrypted communications technology such as IPSec (IP Security) to encrypt the content of communications between the host and the storage control device is considered.

When encrypting communications, information employed in encryption of communications such as the encryption key and method of encryption (encryption algorithm) must be held at both the host and the storage control device. The storage control device has one or a plurality of communications control boards conducting communications with the host, and information employed in encrypted communications is stored in the memory on this communications control board. For example, when the communications control board is removed from the storage control device for maintenance and the like, the memory storing information employed in encrypted communications is also removed away from the storage control device. When the memory on the removed communications control board is accessed by a third party and the information extracted, there is a possibility that content of subsequent communications between the host and the storage control device will be surreptitiously viewed or altered for fraudulent purposes.

SUMMARY OF THE INVENTION

Therefore, an object of the present invention is to provide a storage control device, host interface control unit of a storage control device, and information protection method of a storage control device, which can improve security. A further object of the present invention is to provide a storage control device, host interface control unit of a storage control device, and information protection method of a storage control device which can prevent leakage of prescribed information to the outside even when the host interface control unit holding the prescribed information employed in encrypted communications is removed from the storage control device. A further object of the present invention is to provide a storage control device, host interface control unit of a storage control device, and information protection method of a storage control device which can restore the prescribed information employed in encrypted communications in a comparatively short time, and restart communications with the host device comparatively quickly, when the host interface control unit is installed to the storage control device. Further objects of the present invention will be clearly apparent from the embodiments disclosed below.

The storage control device according to one aspect of the present invention to solve the afore-mentioned problems is a storage control device having a case, a host interface control unit removably provided in the case and conducting communications with a host device, a disk interface control unit provided in the case and conducting communications with a storage device, and a primary memory unit provided in the case and connected to both the host interface control unit and the disk interface control unit. The host interface control unit has a send-receive unit connected to the host device via a communications network, an encrypted communications unit for encrypted communications with the host device via the send-receive unit, a secondary memory unit connected to the encrypted communications unit and storing prescribed information employed in the encrypted communications, and a control unit controlling communications with the host device. When the host interface control unit replacement instruction is received, the control unit causes the prescribed information stored in the secondary memory unit to be deleted.

The prescribed information employed in encrypted communications can be, for example, encryption key information, and information indicating the type of encryption method. For example, the host interface control unit is removed from the storage control device when a fault occurs in the host interface control unit, or in the maintenance of the host interface control unit is needed. In this case, an instruction to replace the host interface control unit is input to the storage control device. This replacement instruction can be provided from, for example, a management terminal connected to the storage control device, or from the host device. When the control unit receives the replacement instruction, the control unit causes the prescribed information stored in the secondary memory unit to be deleted. Thus, removal of the secondary memory unit, with the prescribed information stored, from the storage control device can be prevented, and reliability and safety are improved.

In one embodiment, when the control unit receives the host interface control unit replacement instruction, the control unit causes the prescribed information to be stored in the primary memory unit, and causes the prescribed information stored in the secondary memory unit to be deleted. In one embodiment, when the control unit of the host interface control unit is installed in the case, the prescribed information stored in the primary memory unit is read and caused to be stored in the secondary memory unit. Thus, for example, when a new host interface control unit is installed in the storage control device, the prescribed information saved in the primary memory unit is stored in the secondary memory unit, and the host interface control unit functions can be rapidly recovered.

For example, when the prescribed information cannot be saved from the secondary memory unit to the primary memory unit due to a fault and the like in the transfer path, only the prescribed information is deleted from the secondary memory unit. Thus, leakage of the prescribed information to the outside can be prevented.

In one embodiment, when the control unit receives the host interface control unit replacement instruction, the control unit (1) evaluates whether or not data can be transferred from the secondary memory unit to the primary memory unit, (2) when transfer of data between the two memories is evaluated to be possible, the prescribed information is transferred from the secondary memory unit to the primary memory unit and stored, and the control unit causes the prescribed information stored in the secondary memory unit to be deleted, and (3) when transfer of data between the two memories is evaluated to be impossible, the control unit causes the prescribed information to be deleted from the secondary memory unit. Thus, whether or not the prescribed information is saved in the primary memory unit can be determined in accordance with the location of the fault.

In one embodiment, the host interface control unit has a plurality of communications structures which can be mutually backed-up, and these communications structures each have a send-receive unit, an encrypted communications unit, a secondary memory unit, and a control unit. When data is unable to be transferred from the secondary memory unit to the primary memory unit in one of the plurality of communications structures, the prescribed information stored in the secondary memory unit of the communications structure is transferred to and stored in the primary memory unit via another of the plurality of communications structures. Thus, even when a fault occurs in one control unit, the prescribed information can be saved to the primary memory unit via another control unit.

The host interface control unit of the storage control device according to another aspect of the present invention is a host interface control unit removably provided in a storage control device and conducting communications with a host device, and has a send-receive unit connected to the host device via a communications network, an encrypted communications unit for conducting encrypted communications with the host device via the send-receive unit, a secondary memory unit connected to the encrypted communications unit and storing prescribed information employed in the encrypted communications, and a control unit controlling communications with the host device. When a host interface control unit replacement instruction is received, the control unit causes the prescribed information stored in the secondary memory unit to be deleted.

An information protection method of a storage control device according to another aspect of the present invention is an information protection method for a storage control device which has a host interface control unit removably provided in a case and conducting encrypted communications with a host device, a disk interface control unit provided in the case and conducting communications with a storage device, and a primary memory unit provided in the case and connected to both the host interface control unit and the disk interface control unit, the information protection method having a replacement evaluation step of evaluating whether or not the host interface control unit replacement instruction has been received, a deletion step of causing deletion of prescribed information employed in the encrypted communications and held in the host interface control unit when a replacement instruction is received, and a notification step of notifying that replacement of the host interface control unit is possible when the prescribed information is deleted.

Furthermore, in one embodiment, (1) a saving step of storing prescribed information held in the host interface control unit in the primary memory unit is provided between the replacement evaluation step and the deletion step, and (2) a replacement complete evaluation step of evaluating whether or not the host interface control unit has been replaced, a saving evaluation step of evaluating whether or not the prescribed information is stored in the primary memory unit when the host interface control unit has been replaced, and a restore step of reading the prescribed information from the primary memory unit and causing retention of this prescribed information in the replaced host interface control unit when the prescribed information is stored in the primary memory unit, are provided after the notification step.

At least part of means, functions, and steps of the present invention can be configured as a computer program loaded and executed by a microcomputer. Such a computer program can be secured and distributed on storage media such as a hard disk or optical disk and the like. Furthermore, the computer program can also be supplied via a communications network such as the Internet and the like.

BRIEF DESCRIPTION OF THE DRAWINGS

FIG. 11 is a flowchart showing deletion processing for security information executed with the storage control device according to the second embodiment.

DESCRIPTION OF THE PREFERRED EMBODIMENTS

Figure 1:
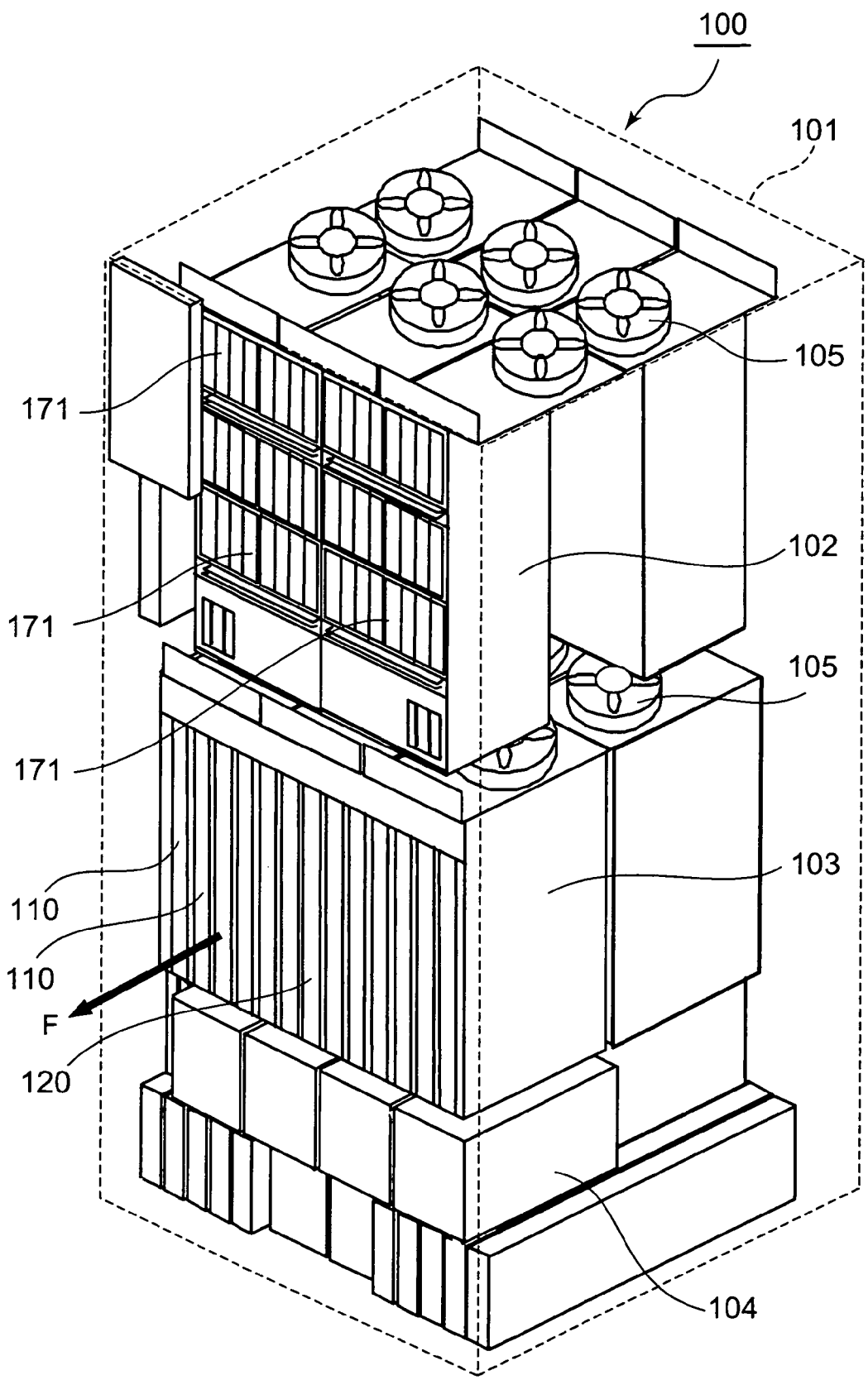
FIG. 1 shows the exterior of the storage control device according to the embodiment of the present invention.

The embodiments of the present invention are described based on the figures. FIG. 1 shows in schematic form the exterior of the storage control device 100 according to the present embodiment. The storage control device 100 can be comprised of, for example, a case 101, a storage box 102, a control box 103, a power supply box 104, and a cooling fan 105. For example, the power supply box 104, the control box 103, and the storage box 102 can be provided in that order from the bottom of the case 101.

A plurality of disk drives 171 such as hard disk drives are removably provided in the storage box 102. A channel adapter (hereafter referred to as 'CHA') 110 conducting communications with the host 10 (see FIG. 2), and a disk adapter (hereafter referred to as 'DKA') 120 conducting communications with each disk drive 171 are provided removably in the control box 103. Furthermore, as described together with FIG. 2, a cache memory 130 and a shared memory 140, a service-processor 180 (hereafter referred to as 'SVP') are also removably provided in the control box 103. For example, by pulling out the CHA 110 and the like in the direction of the arrow F when conducting maintenance work, the CHA 110 and the like can be removed from the control box 103. The checked CHA 110 or new CHA 110 is installed by insertion into the control box 103 in the reverse direction of the arrow F. A power supply circuit for generating one or a plurality of DC power supplies from an AC power supply, and a battery circuit, are provided in the power supply box 104.

This storage control device 100 can conduct encrypted communications with the host 10, and when the CHA 110 is removed from the control box 103, the security information held in the CHA 110 is deleted. The present embodiment is described in greater detail below.

First Embodiment

Figure 2:
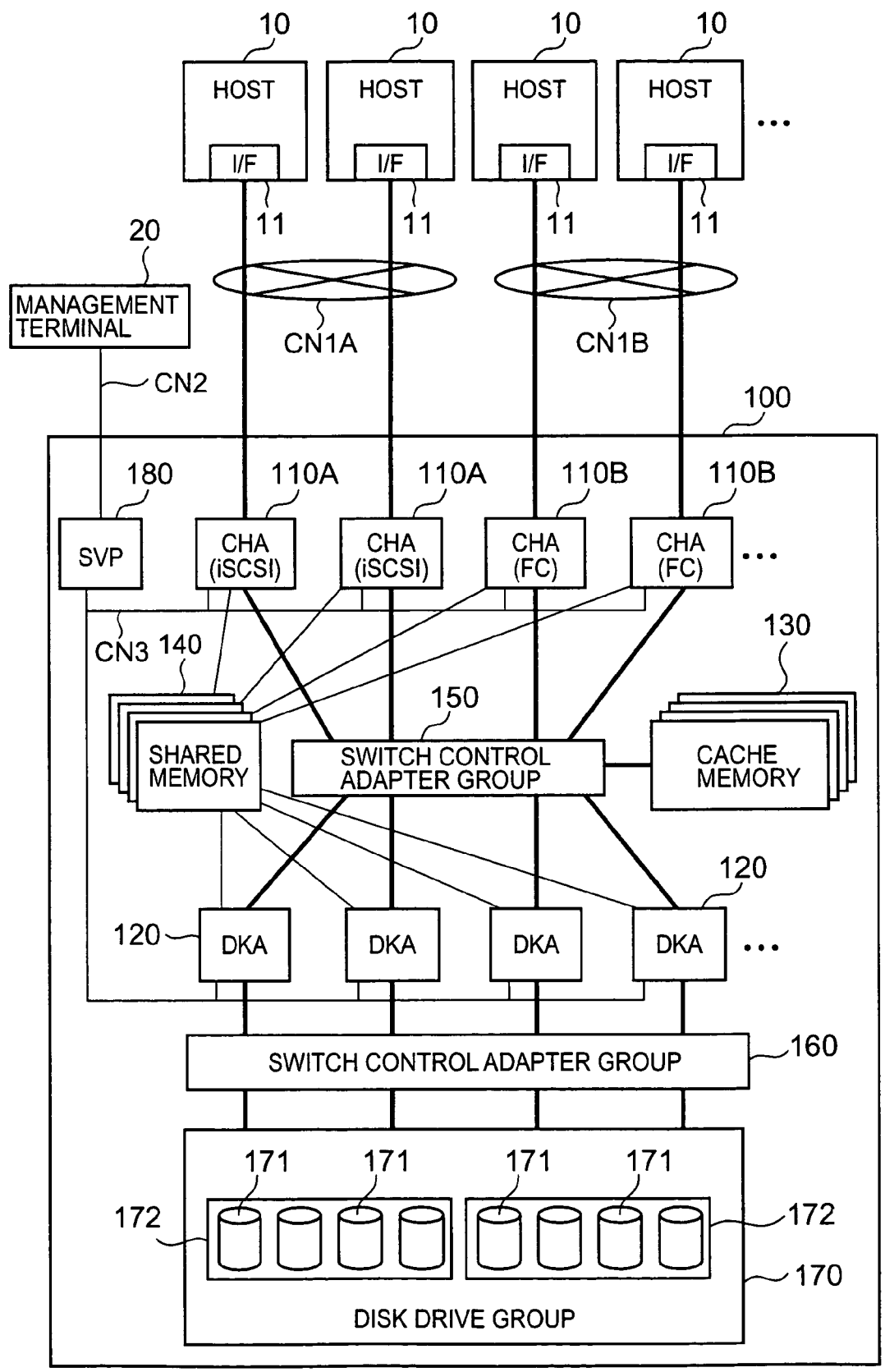
FIG. 2 is a block diagram showing the overall configuration of the storage control device.

FIG. 2 is a block diagram of the storage control device 100. The storage control device 100 can be connected to a plurality of hosts 10 via the communications networks CN1A and CN1B. The hosts 10 may be, for example, open hosts or mainframe hosts. Furthermore, each host 10 can communicate with the storage control device 100 via a differing type of communications protocol, and has an interface ('I/F' in figures) 11 in accordance with the type of communications protocol. For example, one host group conducts communications based on iSCSI via a network CN1A such as the Internet or a LAN (Local Area Network). Another host group conducts communications based on the Fiber Channel Protocol via a network CN1B configured as an FC-SAN (Fiber Channel Storage Area Network). The storage control device 100 need not be connected to each host 10 via a plurality of types of communications networks CN1A and CN1B. In the present embodiment, encrypted communications using at least iSCSI is sufficient.

The management terminal 20 is a device for collecting various types of information for the storage control device 100, and providing the necessary instructions to the storage control device 100, via the SVP 180 described below. The management terminal 20 is connected to the SVP 180 via, for example, a communications network CN2 such as a LAN and the like. The management terminal 20 has a GUI (Graphical User Interface) based on, for example, a web browser and the like, and can collect various information, and inputs instructions, by logging in to a WWW (World Wide Web) server provided by the SVP 180. By providing management software for providing management instructions to the storage control device 100 in the host 10, various instructions can also be provided to the storage control device 100 from the host 10.

The configuration of the storage control device 100 is described below. The storage control device 100 has, for example, a plurality of CHAs 110A and 110B (hereafter referred to as 'CHA 110' unless specifically identified), a plurality of DKAs 120, a plurality of cache memories 130, a plurality of shared memories 140, various switch control adapter groups 150 and 160, a storage unit 170, and a SVP 180.

Each CHA 110 is a dedicated package for controlling data transfer between hosts 10. The CHA 110 is described in greater detail below, however each CHA 110 has a plurality of communications ports, and may be connected to at least one host 10. Each CHA 110 controls data transfer separately between hosts 10. As shown in the figure, CHA 110A conducts encrypted communications with the host 10 based on iSCSI. CHA 110B conducts communications with the host 10 based on the Fiber Channel Protocol.

Each DKA 120 controls data transfer with the storage unit 170. By converting and the like the logical block address (LBA) specified from the host 10 to a physical address, each DKA 120, for example, accesses each disk drive 171 and reads or writes data. The DKA 120 and CHA 110 can be configured as separate packages, or can be configured as a composite package having both functions.

Each cache memory 130 stores write data written from the host 10, and read data read by the host 10. The cache memory 130 may be comprised of, for example, volatile or non-volatile memory. When the cache memory 130 is comprised of volatile memory, the memory is desirably backed-up with a battery power supply and the like from the power supply box 104. The cache memory 130 can be comprised of two areas being a read cache area and a write cache area, and data stored in the write cache area can be multiple-stored.

Shared memory (also referred to as 'control memory') 140 may be comprised of, for example, non-volatile memory, or comprised of volatile memory. For example, control information and management information and the like is stored in shared memory 140. This information such as control information and the like can be multiple-stored in a plurality of shared memories 140. Furthermore, as described below, security information employed for encrypted communications is stored in the shared memory 140 in some cases.

Shared memory 140 and cache memory 130 can be configured as separate memory packages, and cache memory 130 and shared memory 140 may also be provided within the same memory package.

The CHA/DKA side switch control adapter group 150 is mutually connected to each CHA 110, each DKA 120, and the cache memory 130. Thus, all CHAs 110 and DKAs 120 can separately write/read data to/from the cache memory 130. The shared memory 140 is connected directly to each CHA 110 and each DKA 120 without connection through the switch control adapter group 150. The switch control adapter group 150 can be configured as a cross-bar switch and the like. The disk drive side switch control adapter group 160 connects each DKA 120 and storage unit 170.

The storage unit 170 is comprised of a plurality of disk drives 171. The physical appearance of the storage unit 170 is equivalent to the storage box 102 shown in FIG. 1. The storage unit 170 can be provided in the same case 101 as controller parts such as the CHAs 110 and the DKAs 120, or can be provided in a case separate from the controller parts.

A variety of hard disk drives, for example, FC disks (Fiber Channel disks), SCSI (Small Computer System Interface) disks, and SATA (Serial AT Attachment) disks and the like can be provided in the storage unit 170. The storage devices installed in the storage unit 170 are not limited to hard disk drives. For example, semiconductor memory drives, optical disk drives, and magnetic tape drives and the like can be used.

Each disk drive 171 has a physical storage area, and a logical storage area is formed by grouping a prescribed number of disk drives 171. One or a plurality of logical volumes are set in this logical storage area. The host 10 reads and writes data to logical volumes.

The SVP 180 is connected to each CHA 110 and DKA 120 via an internal network CN3 such as a LAN. The SVP 180 can access, for example, each shared memory 140 via each CHA 110, and collect information for each DKA 120 via each shared memory 140. Thus, the SVP 180 collects various internal statuses of the storage control device 100, and provides these statuses to the management terminal 20 unchanged or after processing. Furthermore, the SVP 180 can induce processing to close each of the packages 110 and 120 and the like based on instructions from the management terminal 20.

Figure 3:
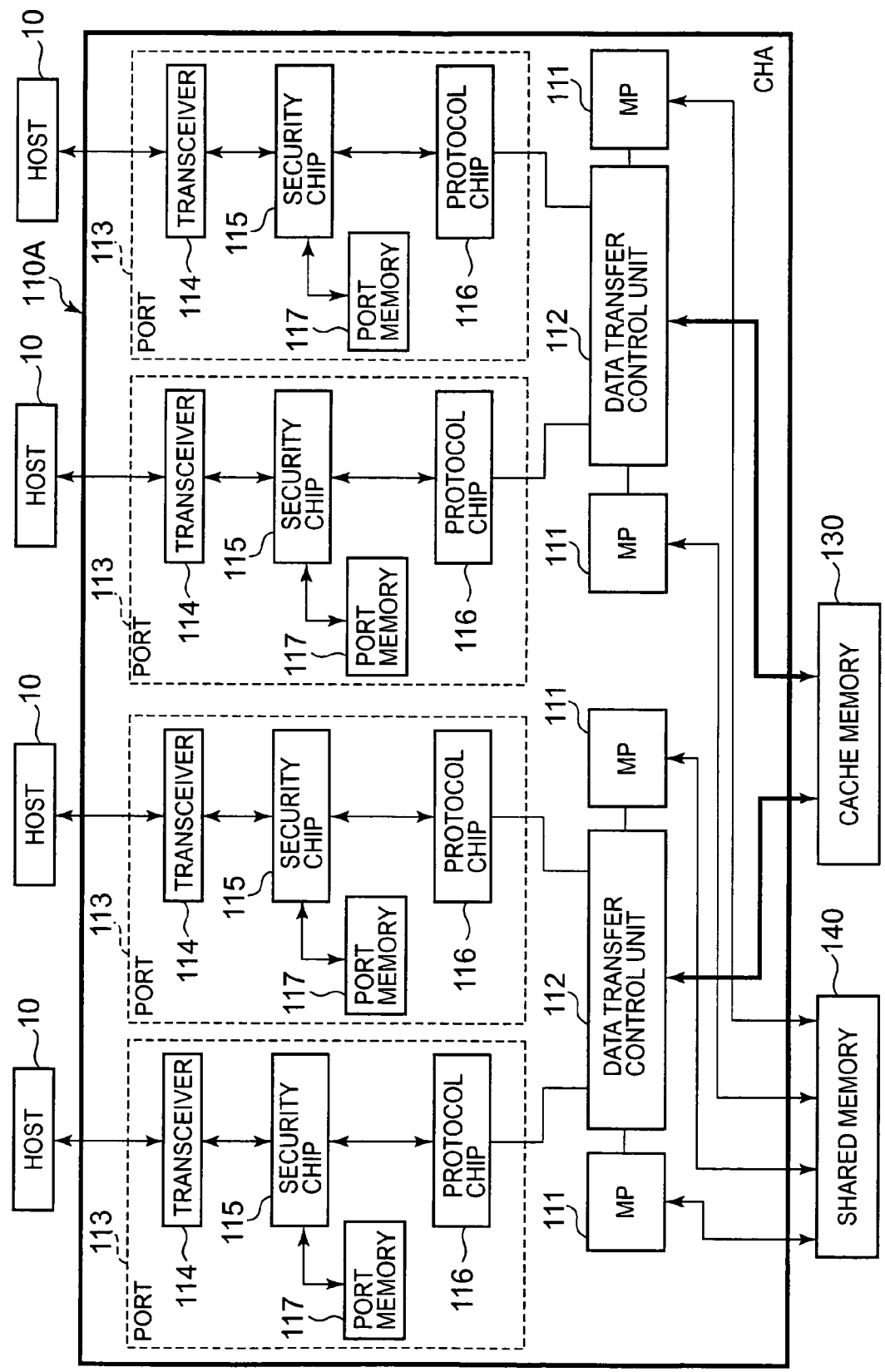
FIG. 3 is a block diagram showing the structure of the channel adapter (CHA)

FIG. 3 is a block diagram showing the circuit configuration of the CHA 110, especially CHA 110A conducting encrypted communications. Each CHA 110A can be, for example, comprised of a plurality of microprocessors (hereafter referred to as 'MP') 111, a plurality of data transfer control units 112, and a plurality of communications ports 113.

In the example shown in FIG. 3, two sets of communications circuits are provided in CHA 110A. Each communications circuit is comprised of two communications ports 113, one data transfer control unit 112, and two MPs 111. In each communications circuit, each MP 111 is connected to a communications port 113 for which the MP 111 is responsible (self system), and is also connected to a communications port 113 for which the other party MP 111 is responsible (other system), via the data transfer control unit 112. In other words, within each communications circuit, two MPs 111 mutually back-up the other party's communications control, thus providing redundancy.

Each communications port 113 maybe comprised of, for example, a transceiver 114, a security chip 115, a protocol chip 116, and a port memory 117. The transceiver 114 is a circuit for sending and receiving data to and from the host 10. The security chip 115 is a circuit for decrypting packets received from the host 10, and encrypting data to be sent to the host 10. The protocol chip is a circuit for controlling the communications protocol (iSCSI in this case) with the host 10. The port memory 117 is a circuit for storing security information and the like employed by the security chip 115.

The connection structure is described below. The transceiver 114 is connected to the security chip 115, and the security chip 115 is connected to the protocol chip. The port memory 117 is connected to the security chip 115. The protocol chip 116 and the MP 111 are each connected to the data transfer control unit 112. Furthermore, the MP 111 is connected to the shared memory 140, and the data transfer control unit 112 is connected to the cache memory 130. The MP 111 can conduct communications with the self system communications port 113, as well as with the other system communications port 113.

Data flow is described below. Write data sent from the host 10 is received by the transceiver 114, and passed to the security chip 115. Based on security information stored in the port memory 117, the security chip 115 decrypts write data encrypted by the host 10. The encrypted write data is transferred from the protocol chip 116 and stored in the cache memory 130 via the data transfer control unit 112. When the MP 111 causes write data to be stored in the cache memory 130, the MP 111 reports write complete to the host 10. Furthermore, the MP 111 writes notification to the shared memory 140 to the effect that write data has been received from the host 10. The DKA 120 then references the shared memory 140, and when write data not yet de-staged is found, reads write data stored in the cache memory 130, converts the data to a physical address and the like, and causes the data to be written to the prescribed disk drive 171. Here, the prescribed disk drive 171 is a drive comprising the logical volume to which the write data is to be written.

When a read command is received from the host 10, the MP 111 checks whether or not the requested data is stored in the cache memory 130, and when the requested data is not stored in the cache memory 130, writes an instruction to the shared memory 140 to read the data from the disk drive 171. When the DKA 120 detects this instruction, the DKA 120 reads data from the prescribed disk drive 171 and converts the data to a physical address and the like, and causes the data to be stored in the cache memory 130. The MP 111 causes data to be read from the cache memory 130 via the data transfer control unit 112, and causes the data to be transferred to the protocol chip 116. The protocol chip 116 processes the data into packets based on iSCSI, and passes the data to the security chip 115. Based on the security information stored in the port memory 117, the security chip 115 encrypts the data, and causes the encrypted data to be input to the transceiver 114. The transceiver 114 sends the data input from the security chip 115 to the host 10.

Figure 4:
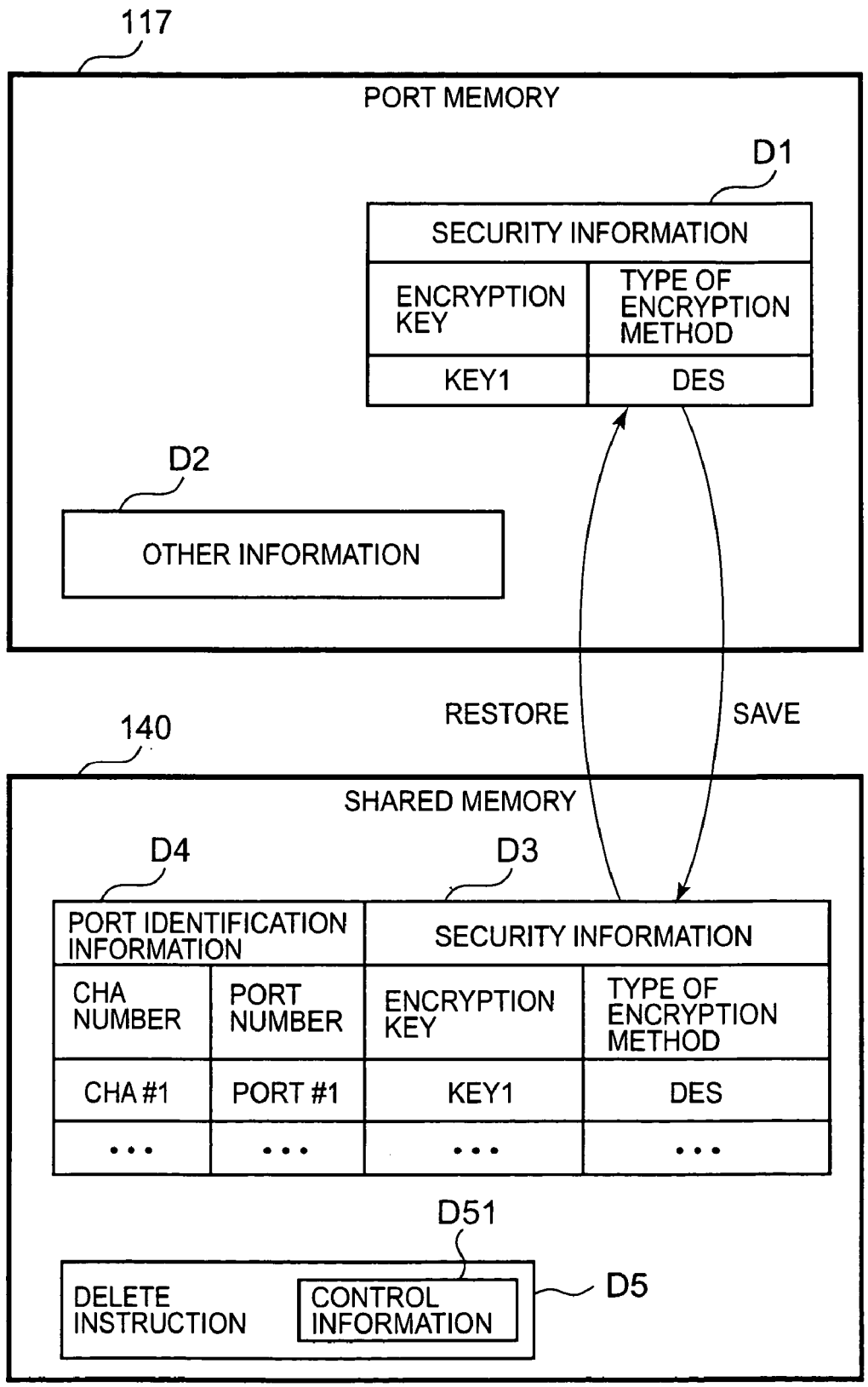
FIG. 4 shows schematically the stored content of the port memory and shared memory.

FIG. 4 shows schematically the stored content of the port memory 117 and the shared memory 140 in schematic form. As shown at the top in FIG. 4, a plurality of types of information is stored in the port memory 117 of each communications port 113.

The first type of information is the security information D1. The security information D1 includes, for example, the encryption key and encryption method employed in encrypted communications with the host 10. Encryption methods can be broadly classified as common key methods (secret key methods) and public key methods. Common key methods are employed with iSCSI, and thus the host 10 and each port 113 must hold key information in secret. Types of common key methods (types of encryption methods) known are, for example, DES (Data Encryption Standard), Triple DES, and AES (Advanced Encryption Standard).

The second type of information stored in the port memory 117 is other security information D2. This other security information D2 can be, for example, port identification information and the like.

The stored content of the shared memory 140 is described below. A plurality of types of information can be stored in the shared memory 140. One is the security information D3 saved from the port memory 117. This security information D3 has the same content as the security information D1 of the port memory 117, however differs in being associated with port identification information D4 for identifying the port used.

One of the other types of information stored in the shared memory 140 is control information D5. This control information D5 includes, for example, various types of tables such as volume management tables and the like, and the delete instruction D51. The delete instruction D51 is control information from the MP 111 responsible for a communications port in which a fault has occurred to another MP 111 provided within the same CHA 110A to instruct deletion (save and delete) of the security information. In other words, when a fault occurs in a CHA 110A and replacement is instructed, the security information D1 is deleted (saved and then deleted) from each port memory 117 of the replaced CHA 110A.

Figure 5:
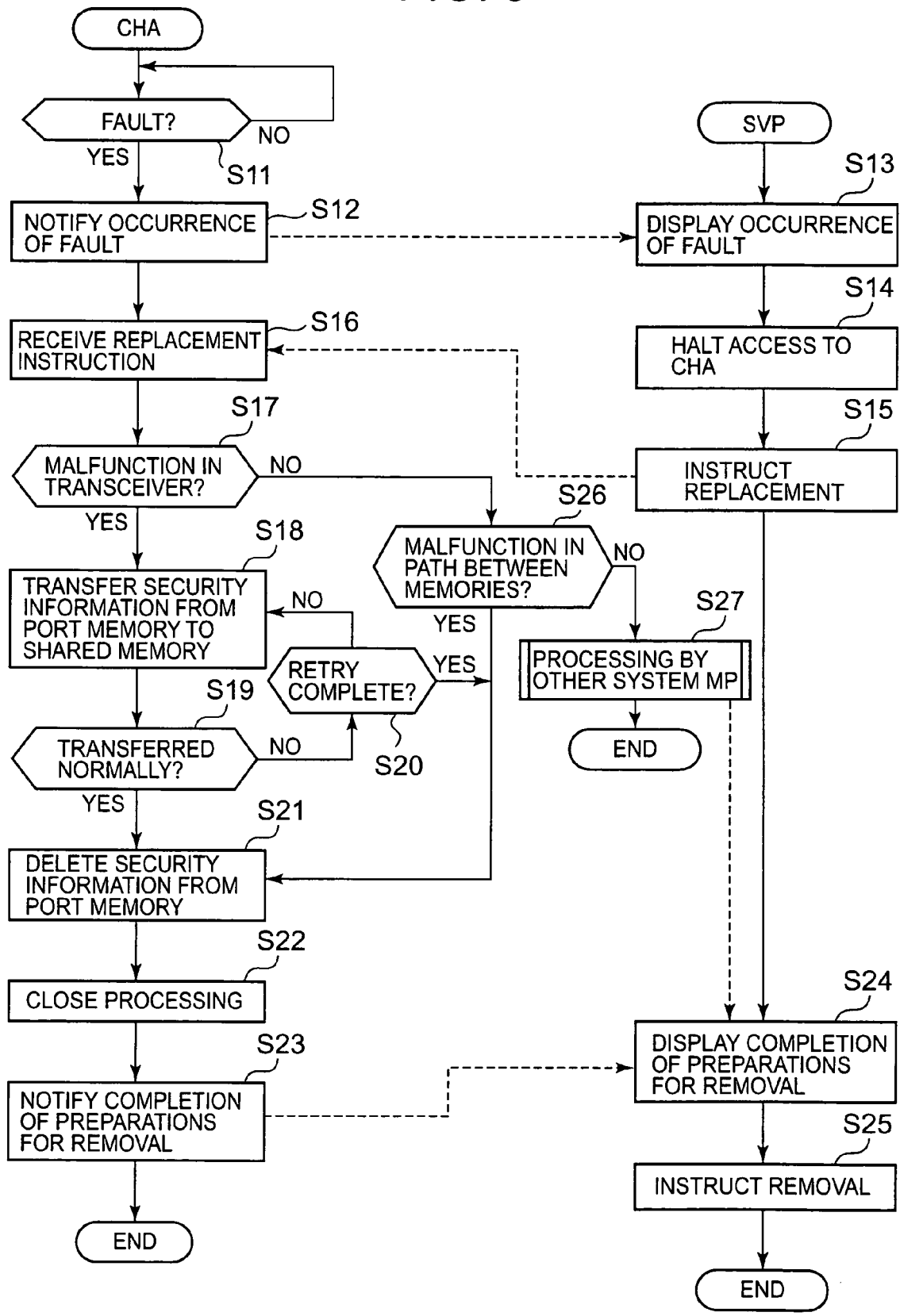
FIG. 5 is a flowchart showing save processing and delete processing for security information executed when a fault occurs in a channel adapter.
Figure 6:
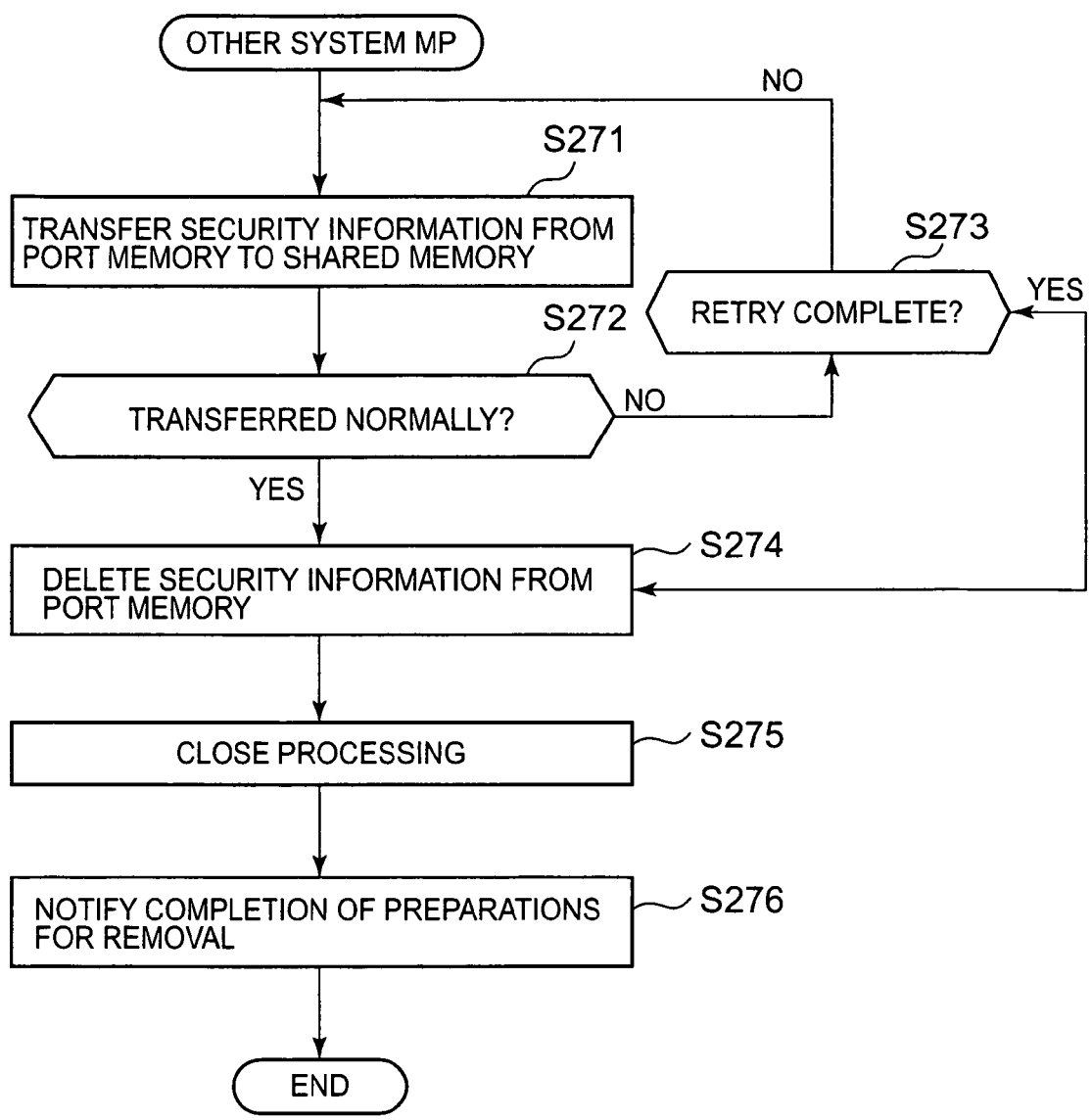
FIG. 6 is a flowchart showing details of S27 in FIG. 5.

Operation of the present embodiment is described below. FIG. 5 and FIG. 6 are flowcharts showing an outline of processing when a fault occurs in CHA 110A.

When the MP 111 of the CHA 110A detects occurrence of a fault (YES in S11), the SVP 180 is notified of occurrence of the fault (S12). The SVP 180 causes display on the management terminal 20 to the effect that a fault has occurred (S13).

The user (maintenance personnel) informed via the management terminal 20 of the occurrence of a malfunction changes the connection between the CHA 110A and the host 10 to the offline status, and halts access to that CHA 110A (S14). Furthermore, maintenance personnel instruct replacement of the CHA 110A in which the fault has occurred (S15). The instruction by maintenance personnel is input to the SVP 180 from the management terminal 20, and input to the CHA 110A from the SVP 180.

When the MP 111 receives the replacement instruction from the SVP 180 (S16), the MP 111 evaluates whether or not the malfunction is in the transceiver 114 (S17). Since a fault more readily occurs at the point of connection of the transceiver 114 with the host 10 than in other components, this point is first evaluated for a malfunction in the transceiver 114. Evaluation of whether or not a malfunction has occurred in the transceiver 114 can be conducted by evaluation based on, for example, a detection signal from a sensor monitoring the output signal of the transceiver 114.

When the transceiver 114 is evaluated as malfunctioning (YES in S17), the MP 111 transfers the security information D1 stored in the port memory 117 from the port memory 117 to the shared memory 140 (S18).

This security information D1 is saved for all port memories 117 of the replaced CHA 110A. In other words, when any one MP 111 determines that security information is to be saved, that MP 111 writes the delete instruction D51 to the shared memory 140. Information (CHA number and the like) for identifying the CHA 110A for which information is to be saved is included in the delete instruction D51. When other MPs 111 detect this delete instruction D51, the security information D1 from the port memory 117 under the control of each MP 111 is caused to be saved to the shared memory 140. Thus, the security information D1 (D3) stored in each port memory 117, and port identification information D4, are associated and stored in the shared memory 140.

The MP 111 evaluates whether or not the security information D1 has been transferred normally from the port memory 117 to the shared memory 140 (S19). When the information has not been transferred normally (NO in S19), the MP 111 retries transfer of the security information D1 the prescribed number of times, or for the prescribed length of time (S20).

When the security information D1 has been transferred normally from the port memory 117 to the shared memory 140 (YES in S19), the MP 111 causes the security information D1 to be deleted from the port memory 117 (S21). The MP 111 then conducts close processing (S22), and when close processing is complete, the MP 111 notifies the SVP 180 that preparations for removal are complete (S23). As described above, each MP 111 within the CHA 110A specified from the SVP 180 for replacement causes the security information D1 stored in each port memory 117 to be deleted, conducts close processing, and notifies the SVP 180 for each.

When the SVP 180 detects that preparations for removal of the CHA 110A are complete (S24), maintenance personnel are notified that that CHA 110A may be replaced (S25). This notification is conducted via the management terminal 20. Maintenance personnel receiving this notification remove the malfunctioning CHA 110A from the storage control device 100, and install a new CHA 110A in the storage control device 100. Processing when installing this new CHA 110A is described further below.

It is also possible that the transceiver 114 is not the location of the malfunction. When a malfunction occurs in a location other than the transceiver 114 (NO in S17), the MP 111 evaluates whether or not the malfunction has occurred in the path between the port memory 117 and the shared memory 140 (S26). Malfunctions occurring in the path between the memories can be, for example, a malfunction in the port memory 117, a malfunction in the security chip 115, a malfunction in the protocol chip 116, a malfunction in the data transfer control unit 112, or a break and the like in the signal line connecting each of these.

When a fault occurs in the path between the memories (YES in S26), the MP 111 immediately causes the security information D1 stored in the port memory 117 to be deleted (S21). This is due to the fact that there is a high possibility that the security information D1 can not be transferred normally from the port memory 117 to the shared memory 140 when a fault occurs in the path between the memories.

On the other hand, when the cause is neither the transceiver 114 (NO in S17) nor the path between the memories (NO in S26), the malfunction is possibly in the MP 111. When the MP 111 (primary MP) responsible for the communications port 113 in which the fault is malfunctioning, processing is conducted with the MP 111 (other system MP) connected to the same data transfer control unit 112 (S27).

FIG. 6 is a flowchart showing processing with the other system MP 111. The MP 111 connected to the same data transfer control unit 112 as the malfunctioning MP 111 causes the security information D1 to be transferred from the port memory 117 of the communications port 113 in which a fault has occurred to the shared memory 140 (S271). The other system MP 111 evaluates whether or not transfer has been completed normally (S272), and when the security information D1 could not be transferred normally (NO in S272), retries transfer the prescribed number of times, or for the prescribed length of time (S273).

When the security information D1 has been transferred normally (YES in S272), the other system MP 111 causes the security information D1 to be deleted from the port memory 117 (S274). The other system MP 111 then conducts close processing (S275), and then notifies the SVP 180 that preparations for removal are complete (S276). Here, when the other system MP 111 takes over saving and deletion of the security information D1, the other system MP 111 writes the delete instruction D51 to the shared memory 140.

Therefore, the other system MP 111 then saves the security information D1 from the port memory 117 under the control of the other system MP 111 to the shared memory 140 based on the delete instruction D51, deletes the security information D1, conducts close processing, and notifies the SVP 180 that preparations for removal are complete.

As described above, when removal of the CHA 110A holding the information to be deleted (security information D1) is decided, the security information D1 is deleted from all port memories 117 in the CHA 110A. Furthermore, if possible, the security information D1 is associated with port identification information and stored in the shared memory 140 prior to deleting the security information D1.

Figure 7:
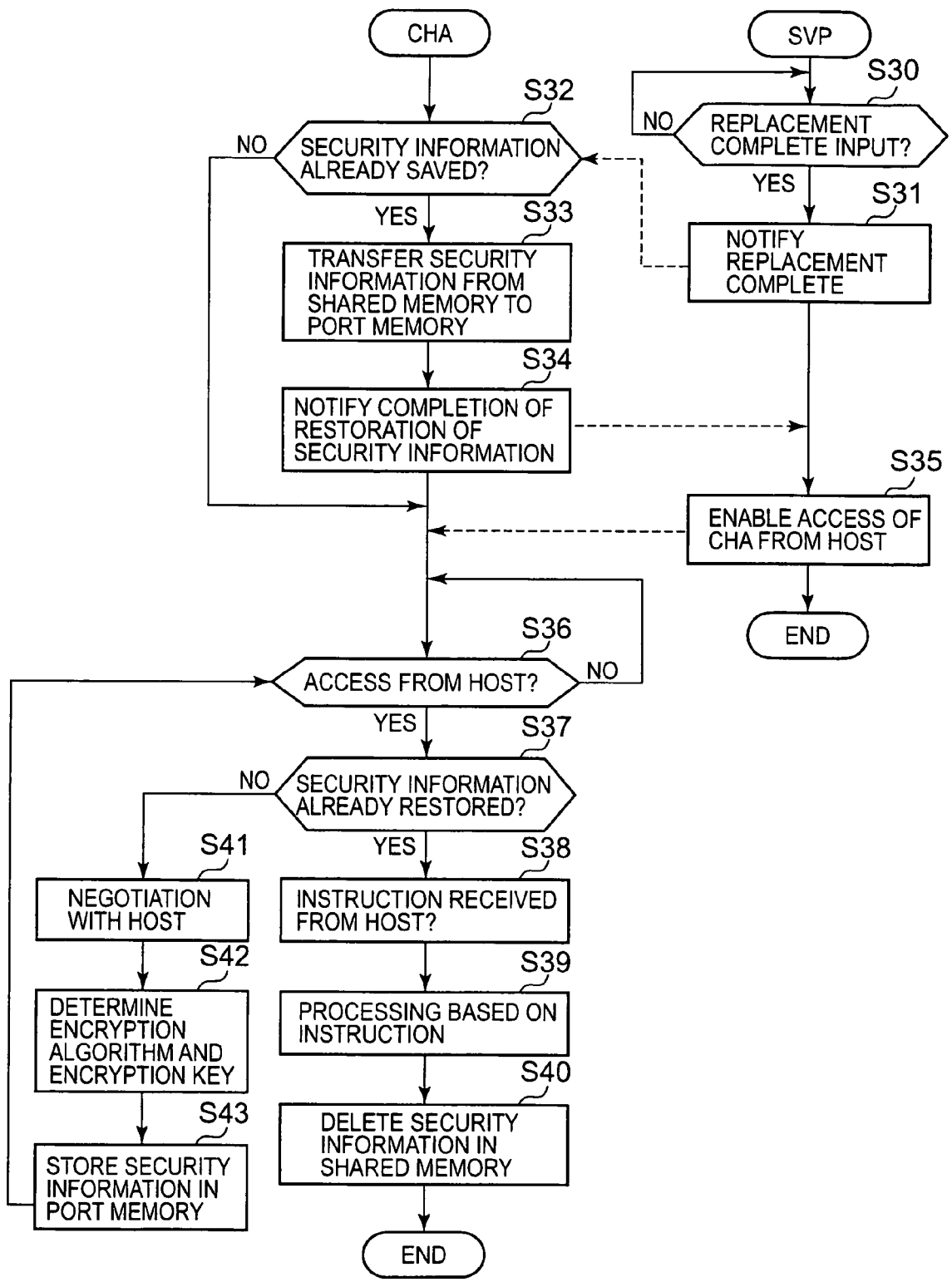
FIG. 7 is a flowchart showing processing for restoration of security information executed for a new replacement channel adapter, and processing of access requests from the host.

Maintenance personnel then install the new CHA 110A in the control box 103. Processing following replacement is described in reference to the flowchart in FIG. 7. When maintenance personnel install the new CHA 110A in the control box 103, maintenance personnel input information to the SVP 180 from the management terminal 20 to the effect that replacement is complete (YES in S30). When the SVP 180 detects, from input by maintenance personnel, that replacement is complete, the SVP 180 notifies the replacement CHA 110A (S31).

Notification of completion of replacement from the SVP 180 is employed as a trigger for restoration of the security information D1. The MP 111 of the replaced CHA 110A evaluates whether or not the security information D1 is saved in the shared memory 140 (S32). For example, the MP 111 searches for the security information D3 and port identification information D4 in the shared memory 140, and evaluates whether or not the security information D1 under the control of the MP 111 exists in the shared memory 140.

When the security information D1 has already been saved to the shared memory 140 (YES in S32), the MP 111 causes the security information D1 to be transferred from the shared memory 140 to the port memory 117 (S33), and when transfer is complete, notifies the SVP 180 to the effect that restoration of the security information D1 is complete (S33). Each MP 111 of the replaced CHA 110A causes the security information D1 under the control of each MP 111 to be read from the shared memory 140, and stored in the port memory 117.

When the SVP 180 receives notification to the effect that restoration of the security information D1 is complete (S34), the replaced CHA 110A and the host 10 are connected and placed in the online status, and access to the replaced CHA 110A from the host 10 is enabled (S35).

On the other hand, when a problem occurs in the path between the port memory 117 and the shared memory 140 as described above, the security information D1 cannot be saved. The security information D1 unable to be saved is therefore deleted from the port memory 117. The evaluation result in S32 is therefore NO, and S33 and S34 are skipped.

As described above, processing to save the security information D1 from each port memory 117 to the shared memory 140, and processing to delete that information, is conducted for each communications port 113. Therefore, even when the security information D1 for a certain communications port 113 can be saved to the shared memory 140, when the security information D1 for another communications port 113 cannot be saved to the shared memory 140 that security information D1 may be deleted. Operation of each communications port 113 differs according to whether or not the security information D1 can be restored.

With access from the host 10 (YES in S36), the accessed communications port 113 is evaluated to determine whether or not the security information D1 has been restored, in other words, whether or not the security information D1 is stored in the port memory 117 (S37).

When the security information D1 is stored in the port memory 117 (YES in S37), the communications port 113 receives a command from the host 10 (S38), and conducts processing based on this command (S39). Processing of this command involves decryption of the cypher using the security information D1, and encryption of data. The MP 111 then checks that communication with the host 10 is completed normally based on the security information D1 restored to the port memory 117, and causes the security information D3 (D1) in the shared memory 140 to be deleted(S40). Thus, free space in the shared memory 140 increases.

Conversely, when security information D1 is not restored to the port memory 117 (NO in S37), since the communications port 113 cannot conduct encrypted communications with the host 10, the security information D1 must be set up again.

The communications port 113 then commences negotiation with the host 10 (S41), and determines the encryption key and encryption method employed for encrypted communications (S42). In greater detail, since sending of the encryption key by unencrypted plaintext communications presents a security problem, a provisional encryption method of sending the encryption key is determined, and the encryption key is sent.

The communications port 113 causes the reset encryption key and encryption method to be stored in the port memory 117 as the security information D1 (S43). The communications port 113 waits for access from the host 10 (YES in S36), processes the command (YES in S37, and S38, S39), and causes the security information D3 (D1) stored in the shared memory 140 to be deleted.

Figure 8A:
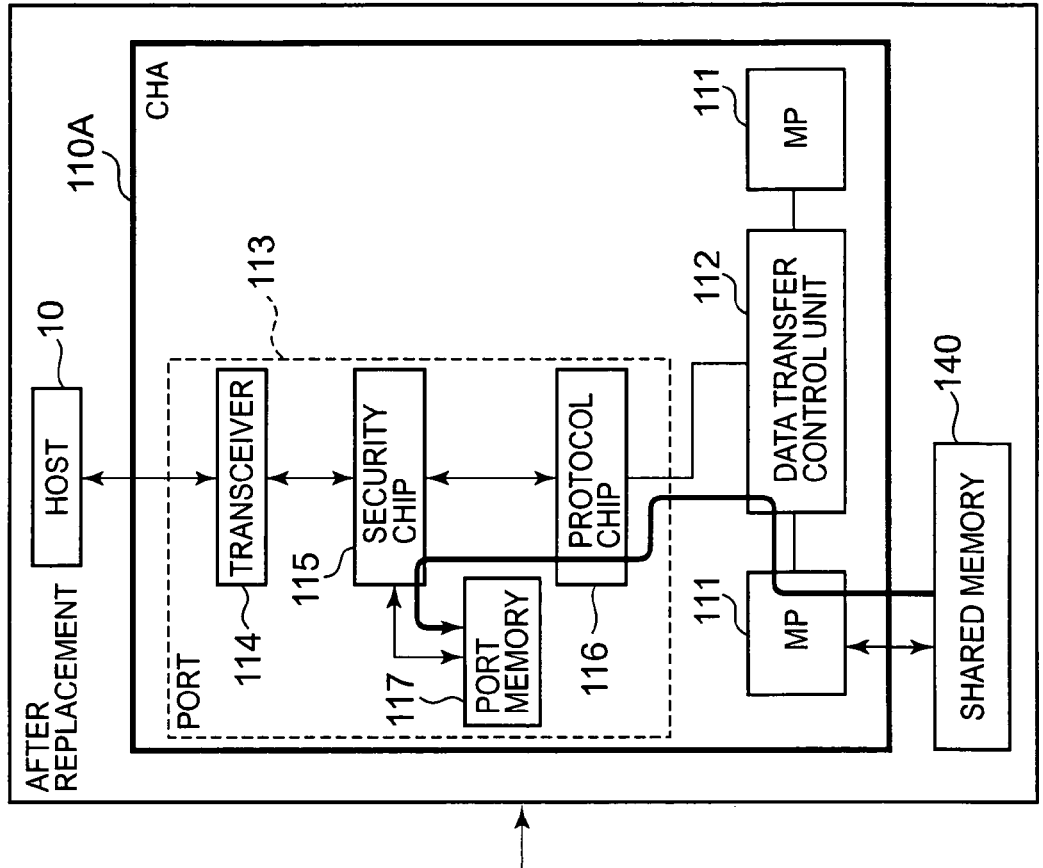
FIG. 8 shows the flow of security information when a fault occurs in a transceiver.
Figure 8B:
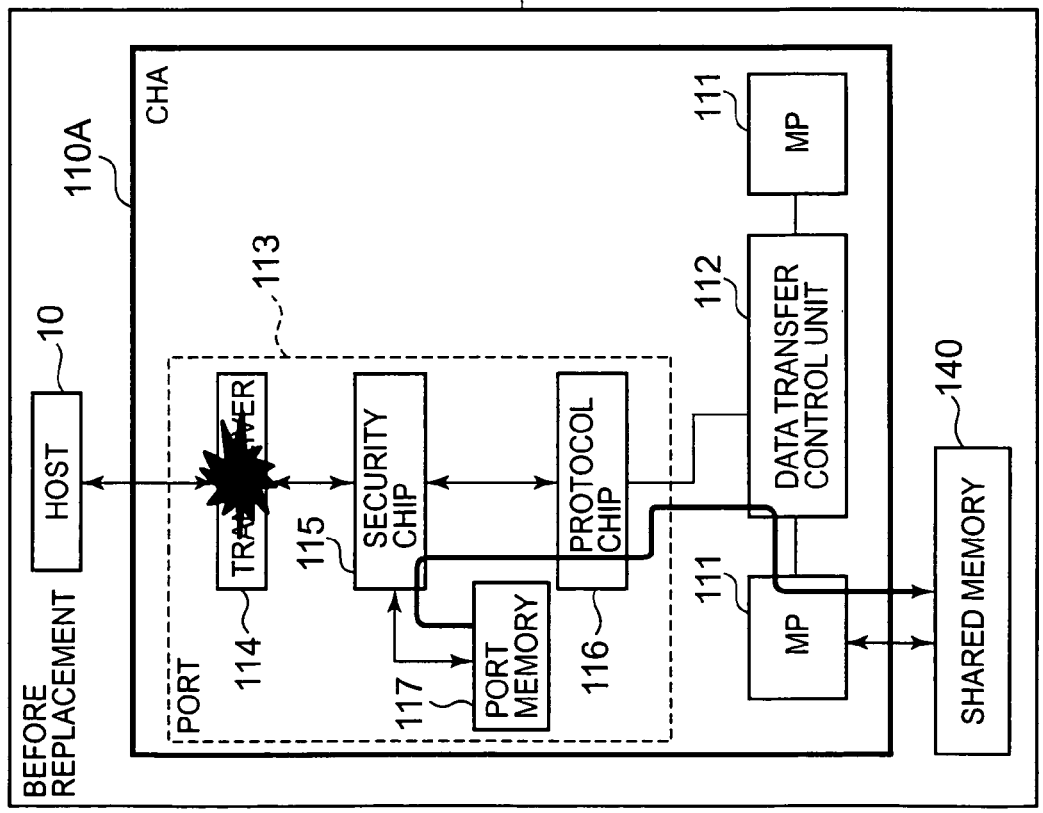
Figure 9B:
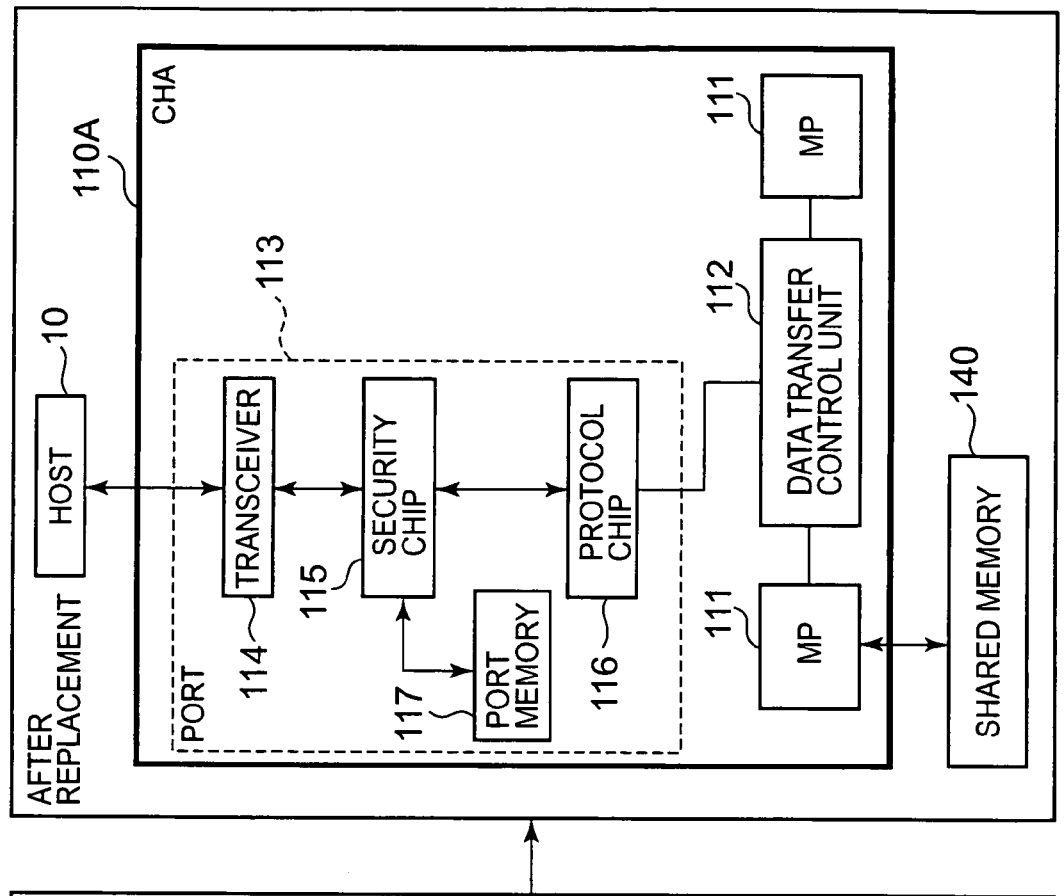
FIG. 9 shows the case of a fault occurring in the path between a port memory and shared memory.
Figure 9A:
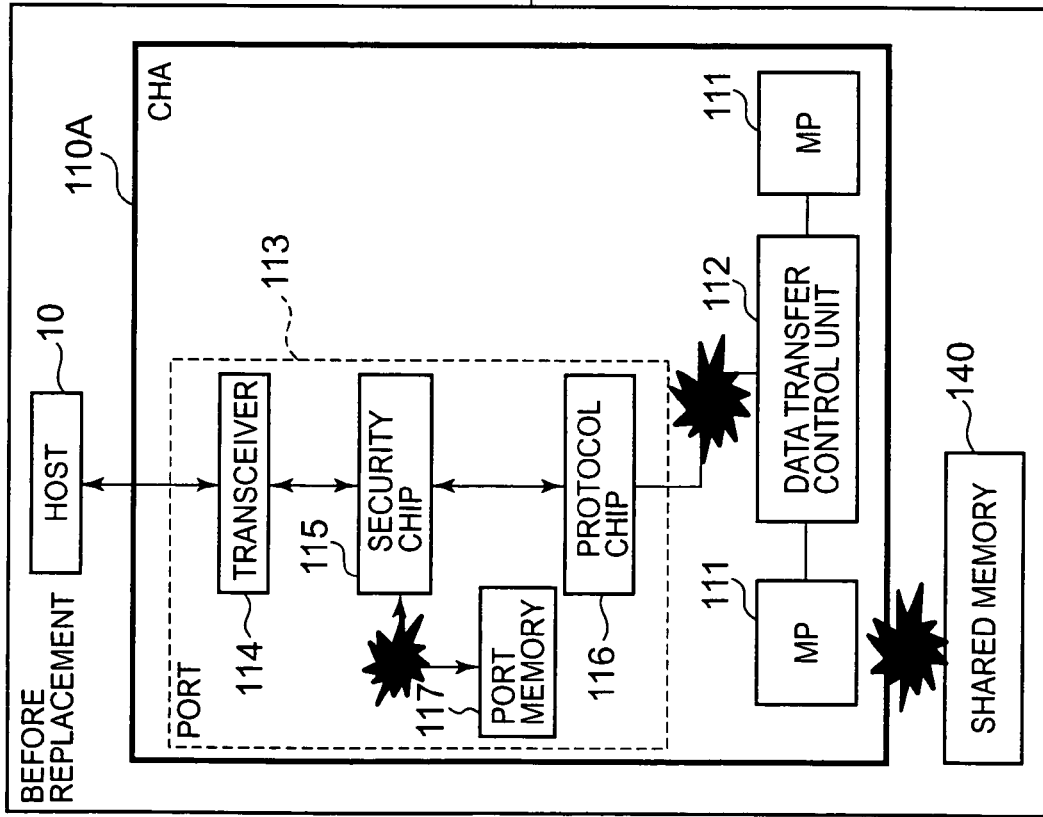

FIG. 8 through FIG. 10 show schematically processing according to the location at which the fault occurs. FIG. 8 shows the case of a malfunction in the transceiver 114. FIG. 8A shows the condition prior to replacement. The MP 111 causes the security information D1 in the port memory 117 to be transferred to, and stored in, the shared memory 140 via the security chip 115, the protocol chip 116, the data transfer control unit 112, and the MP 111. This path is shown by the thick line in the figure. FIG. 8B shows the condition following replacement of the CHA 110A. The MP 111 causes the security information D1 stored in the shared memory 140 to be transferred in the reverse direction to that shown in FIG. 8A, and stored in the port memory 117.

FIG. 9 shows the case of a fault occurring in the path between the port memory 117 and the shared memory 140. For the sake of convenience in the description, the figure shows the simultaneous occurrence of faults at a plurality of points, however occurrence of a fault at a single point on the path between the memories is sufficient. In this case since the security information D1 cannot be transferred normally from the port memory 117 to the shared memory 140, the security information D1 is deleted from the port memory 117. FIG. 9B shows the condition following replacement. Following replacement, the communications port 113 negotiates with the host 10, and resets the encryption key and encryption method.

Figure 10A:
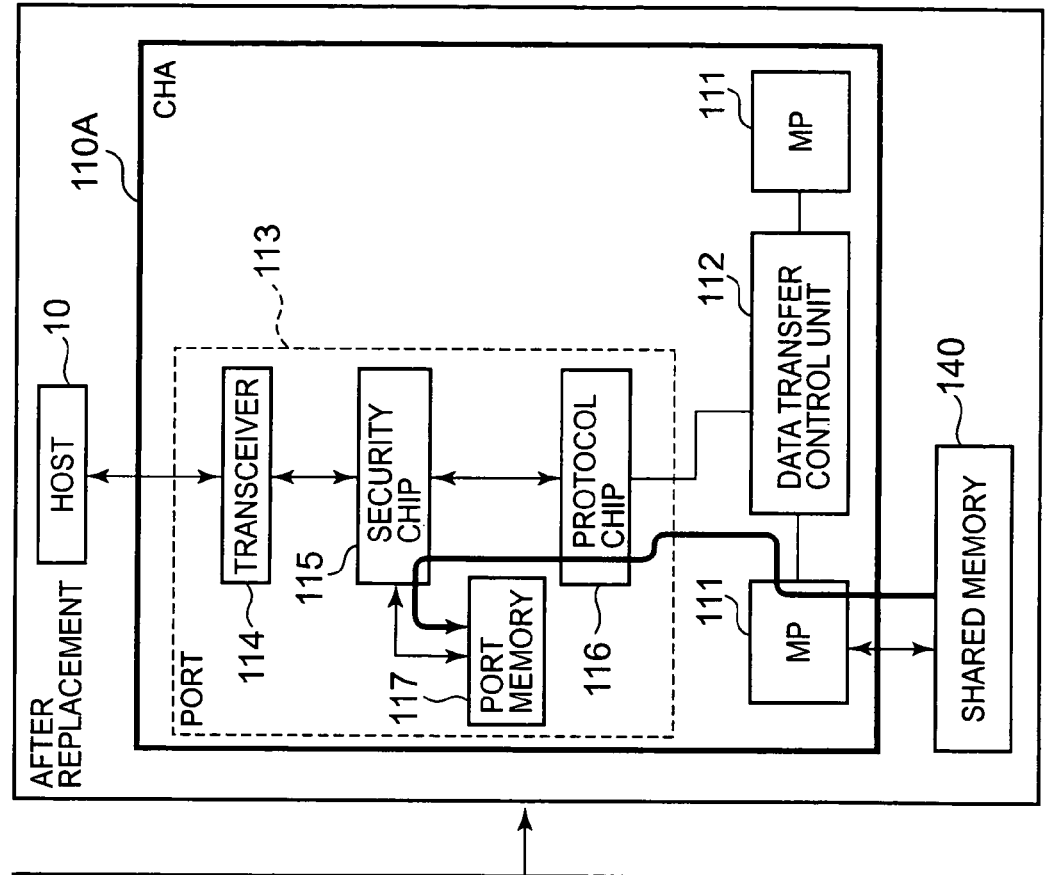
FIG. 10 shows the flow of security information when a fault occurs in the MP.
Figure 10B:
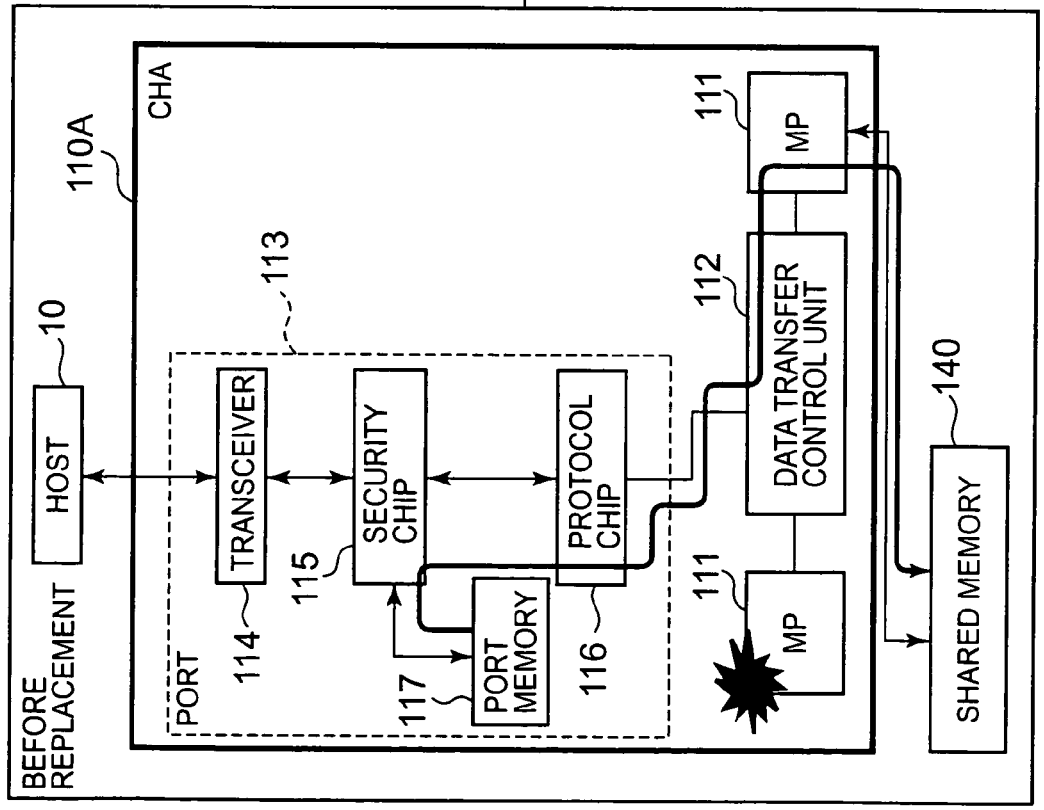

FIG. 10 shows the case in which a fault has occurred in the MP 111. FIG. 10A shows the condition prior to replacement. As shown in the thick line in the figure, the other system MP 111 backing-up the malfunctioning MP 111 causes the security information D1 in the port memory 117 to be transferred to and stored in the shared memory 140 via the security chip 115, the protocol chip 116, the data transfer control unit 112, and the other system MP 111. FIG. 10B shows the condition following replacement. Following replacement, the MP 111 controlling the security information D1 saved in the shared memory 140 causes the security information D1 read from the shared memory 140 to be transferred to and stored in the port memory 117 via the security chip 115, the protocol chip 116, the data transfer control unit 112, and the other system MP 111. This path is shown by the thick line in the figure.

The present embodiment demonstrates the following effects due to the afore-mentioned configuration. The present embodiment is configured so that the MP 111 causes security information D1 stored in the port memory 117 to be deleted when the CHA 110A replacement instruction is received. The security information D1 can therefore be deleted prior to removing the CHA 110A from the control box 103. Thus, reading of the security information D1 outside the storage control device 100 by a third party can be prevented, and the reliability and security of the storage control device 100 is improved.

The present embodiment is configured so that the MP 111 causes security information D1 to be stored in the shared memory 140 when the CHA 110A replacement instruction is received, and the security information stored in the port memory 117 to then be deleted. Therefore, the security information D1 is held in the storage control device 100, and can be provided following the replacement of the CHA 110A.

The present embodiment is configured so that the MP 111 reads security information D1 stored in the shared memory 140, and causes that security information D1 to be stored in the port memory 117, when the CHA 110A is installed in the case 101. Therefore, security information D1 can be quickly set in the replaced CHA 110A, and the CHA 110A can be used immediately, improving ease of use.

The present embodiment is configured so that, when the CHA 110A replacement instruction is received, the MP 111 (1) evaluates whether or not transfer of data from the port memory 117 to the shared memory 140 is possible, (2) and when the transfer of data between the memories is evaluated to be possible, causes security information D1 to be transferred from the port memory 117 and stored in the shared memory 140 and the security information stored in the port memory 117 to then be deleted, and (3) when transfer of data between the memories is evaluated to be impossible, causes the security information D1 to be deleted from the port memory 117. Handling of the security information D1 can therefore be changed according to the location of the fault, and ease of use can be improved while maintaining security.

In the present embodiment, a redundant structure is formed from a plurality of MPs 111 and a plurality of communications ports 113, and configured so that when a fault occurs in one MP 111, another MP 111 conducts save processing and delete processing for the security information D1. Removal of the CHA 110A without deletion of the security information D1 under the control of the malfunctioning MP 111 can therefore be prevented, and reliability is increased.

In the present embodiment, each communications port 113 is configured so that save processing and delete processing for each security information D1 is conducted while coordinating via the delete instruction D51 stored in the shared memory 140. Security of the storage control device 100 can therefore be improved with a comparatively simple configuration.

Second Embodiment

The second embodiment is described based on FIG. 11. The present embodiment is equivalent to a variation of the first embodiment, and permits deletion of security information D1 even when the CHA 110A is removed from the control box 103 without interfering with the normal procedure.

FIG. 11 is a flowchart showing deletion processing. The CHA 110A monitors whether or not the connection with the storage control device 100 has been disconnected (S50). For example, when a third party attempts to illegally remove the CHA 110A from the control box 103, disconnection between the CHA 110A and the storage control device 100 is detected (YES in S50). The CHA 110A (MP 111) checks whether or not the security information D1 has already been deleted from the port memory 117 (S51), and when the security information D1 has not been deleted (NO in S51), deletes the security information D1 (S52). An emergency power supply such as a small battery or a capacitor may be mounted in the CHA 110A to provide electrical power to delete the security information D1 from the port memory 117.

In the present embodiment configured in this manner, even when the CHA 110A is removed from the storage control device 100 by other than normal replacement, the security information D1 can be deleted, and security ensured.

The present invention is not limited to the afore-mentioned embodiments, and a variety of addition and changes and the like can be employed provided they do not deviate from the scope of the present invention. For example, the destination to which the security information is saved is not limited to shared memory and may be cache memory, or, a configuration may be employed in which security information is saved to a disk drive, even though access time is increased. Furthermore, the present invention is not limited to iSCSI, and for example, other protocols such as FiberChannel, ESCON (registered trademark), FICON (registered trademark), NAS, and Multi-protocol and the like can be used.

What is claimed is:

1. A storage control device for providing secure data storage to a plurality of host computers via at least one communications network, comprising:
   a case;
   a channel adapter unit removably provided in the case and having a port conducting encrypted communications with at least one of the plurality of host computers;
   a disk adapter unit provided in the case and conducting communications with a disk drive storage unit; and
   a shared memory unit provided in the case and connected to both the channel adapter unit and the disk adapter unit;
   wherein
   the channel adapter unit comprises:
   a transceiver unit connected to the at least one of the plurality of host computers via the at least one communications network;
   an encrypted communications unit for providing encrypted communications with the at least one of the plurality of host computers via the transceiver unit;
   a port memory unit connected to the encrypted communications unit and storing prescribed information employed in the encrypted communications; and
   a data transfer control unit controlling data transfer between the channel adapter unit and the at least one of the plurality of the host computers;
   wherein the data transfer control unit causes the prescribed information stored in the port memory unit to be deleted in response to receiving an instruction to prepare the channel adapter unit for removal and replacement.

2. The storage control device according to claim 1 wherein the data transfer control unit causes the prescribed information stored in the port memory unit to be deleted after storing the prescribed information in the shared memory unit.

3. The storage control device according to claim 2 wherein the data transfer control unit reads the prescribed information stored in the shared memory unit and causes that prescribed information to be stored in the port memory unit, following installation of the channel adapter unit back in the case.

4. The storage control device according to claim 1, wherein, when receiving the instruction to prepare the channel adapter unit for removal and replacement, the data transfer control unit:
   (1) evaluates whether or not the prescribed information can be transferred from the port memory unit to the shared memory unit;
   (2) causes the prescribed information to be transferred from the port memory unit and stored in the shared memory unit, and then causes the prescribed information stored in the port memory unit to be deleted, when transfer of data between the two memories is evaluated to be possible; and (3) causes the prescribed information to be deleted from the port memory unit when transfer of data between the two memories is evaluated to be impossible.

5. The storage control device according to claim 1, wherein the channel adapter unit comprises a plurality of communications structures which can be mutually backed-up, each communications structure comprising the transceiver unit, the encrypted communications unit, the port memory unit, and the data transfer control unit, wherein when the prescribed information is unable to be transferred from the port memory unit to the shared memory unit in one of the plurality of communications structures, the prescribed information stored in the port memory unit of the communications structure is transferred to and stored in the shared memory unit via another of the plurality of communications structures.

6. A channel adapter unit removably provided in a storage control device for providing secure data storage to a plurality of host computers via at least one communications network, comprising:

a send-receive unit connected to one of the plurality of host computers via the at least one communications network;

an encrypted communications unit for conducting encrypted communications with the one of the plurality of host computers via the send-receive unit;

a secondary memory unit connected to the encrypted communications unit and storing prescribed information employed in the encrypted communications; and a control unit controlling communications with the one of the plurality of host computers;

wherein when receiving a channel adapter unit replacement instruction, the control unit causes the prescribed information stored in the secondary memory unit to be deleted.

7. An information protection method for a storage control device for providing secure data storage to a plurality of host computers via at least one communications network, the storage control device comprising:

a channel adapter unit removably provided in a case and conducting encrypted communications with at least one of the plurality of host computers;

a disk adapter unit provided in the case and conducting communications with a disk drive storage unit; and a primary memory unit provided in the case and connected to both the channel adapter unit and the disk adapter unit; the information protection method comprising:

a replacement evaluation step of evaluating whether or not an instruction to prepare the channel adapter unit for removal and replacement has been received;

a deletion step of causing deletion of prescribed information employed in the encrypted communications and held in the channel adapter unit when the instruction to prepare the channel adapter unit for removal and replacement is received; and a notification step of issuing a notification that replacement of the channel adapter unit is possible when the prescribed information has been deleted.

8. The information protection method for a storage control device according to claim 7, further comprising:

(1) between the replacement evaluation step and the deletion step, a saving step of causing the prescribed information held in the host channel adapter unit to be stored in the primary memory unit; and (2) after the notification step, a replacement complete evaluation step of evaluating whether or not the channel adapter unit has been replaced;

a saving evaluation step of evaluating whether or not the prescribed information is stored in the primary memory unit when the channel adapter unit has been replaced; and a restore step of reading the prescribed information from the primary memory unit and causing retention of this prescribed information in the replaced channel adapter unit when the prescribed information is stored in the primary memory unit.

* * * * *